March 24, 1931.  A. S. HUGHES ET AL  1,797,344
DUMPING TRUCK
Filed Oct. 11, 1927   3 Sheets-Sheet 1

Arthur S. Hughes
and Howard F. Gorsuch, INVENTORS
BY
Siggers & Adams,
ATTORNEYS

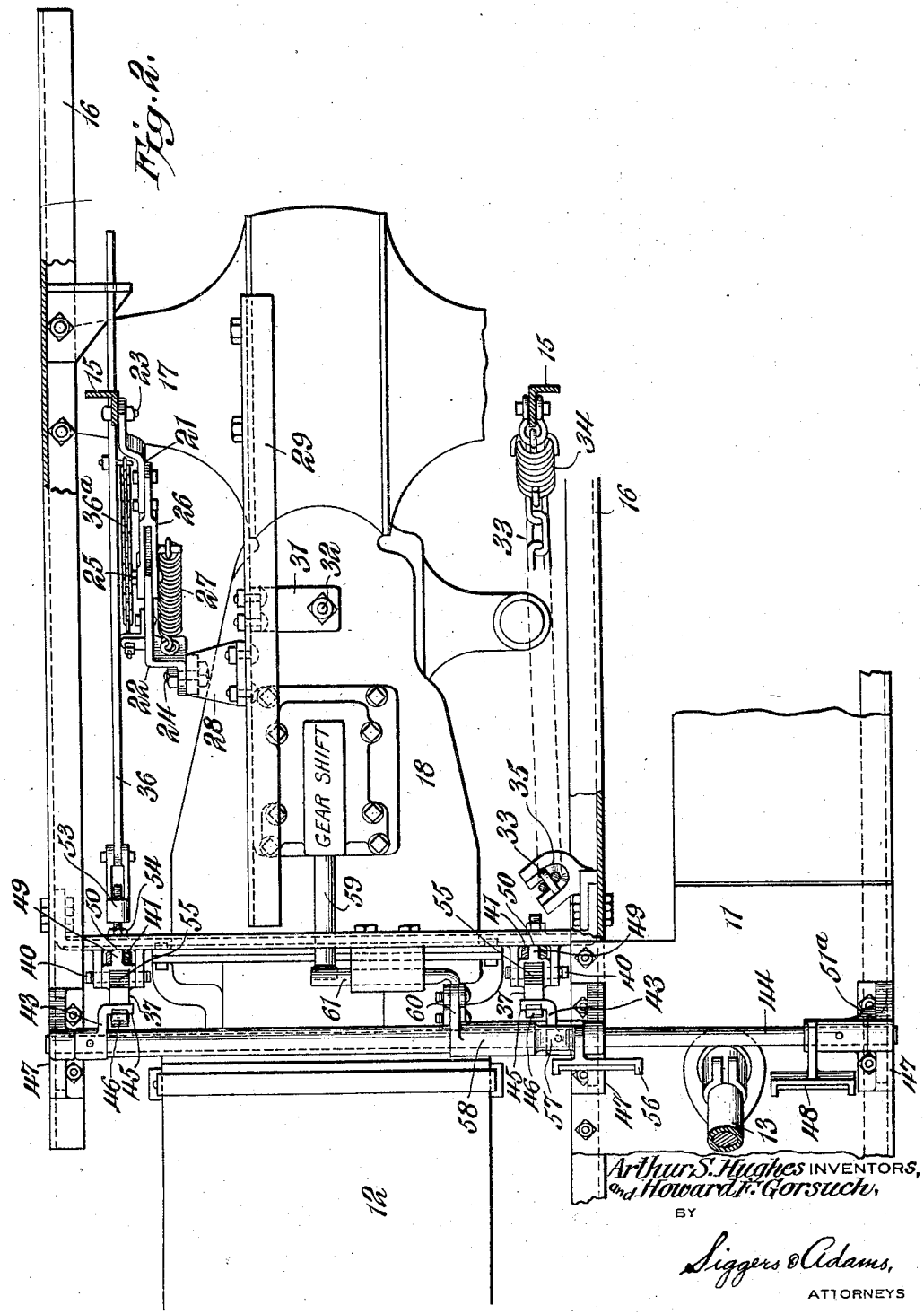

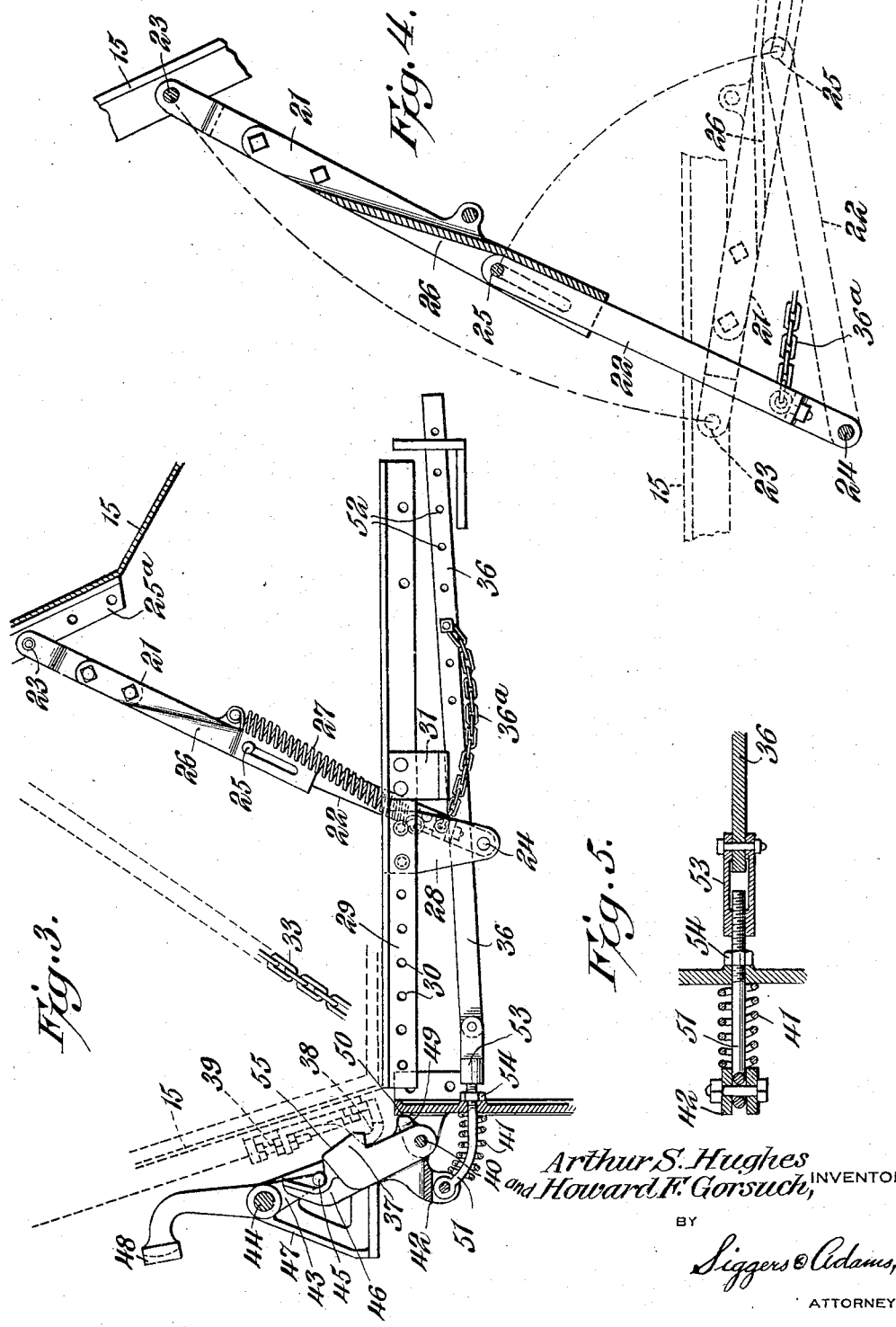

Patented Mar. 24, 1931

1,797,344

UNITED STATES PATENT OFFICE

ARTHUR S. HUGHES AND HOWARD F. GORSUCH, OF MANSFIELD, OHIO, ASSIGNORS TO THE HUGHES-KEENAN COMPANY, OF MANSFIELD, OHIO, A CORPORATION OF OHIO

DUMPING TRUCK

Application filed October 11, 1927. Serial No. 225,528.

This invention relates to dumping trucks and, among other objects, aims to provide an improved truck of this character which is simple and durable in construction and easy to manipulate.

The nature of the invention may be readily understood by reference to one illustrative construction embodying the invention and shown in the accompanying drawings.

In said drawings:

Fig. 2 is a plan of the same portion of the truck, the dumping body having been removed to show the underlying and supporting structure;

Fig. 3 is a side sectional elevation of the dumping control mechanism, the dotted lines showing the normal position of the body;

Fig. 4 is a detail of the mechanism for holding the body in discharge position, the dotted lines illustrating its idle position;

Fig. 5 is a sectional detail of the discharge release mechanism.

Figure 1:
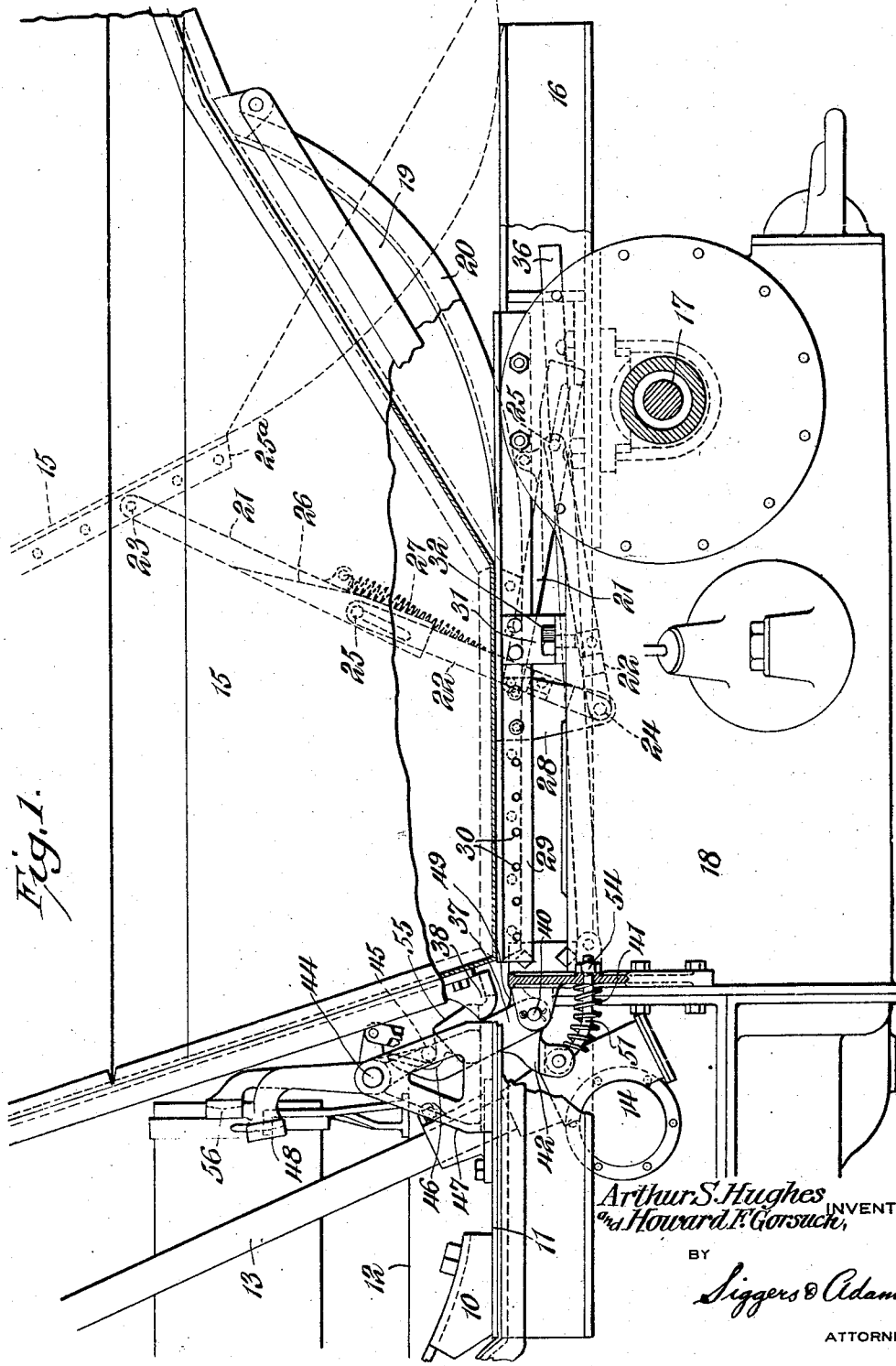
Fig. 1 is a side elevation, partly in section, of the dumping end of the truck, the dotted lines indicating the position of the dumping body when discharging its contents.

The inventive construction may readily be adapted to a standard form of truck or tractor and in this instance is illustrated as applied to a Fordson tractor. Such a tractor being of well known construction, only those portions directly associated with the dumping body and its mechanism are illustrated.

In the present case, the driver's seat is removed from its usual position and placed at the side of the engine over the front wheels and facing to the normal rear of the tractor, the base 10 of the seat spring being shown supported on a platform 11 at the side of the engine 12. The steering post 13 is shifted to a position in front of the seat and likewise reversed as is the steering worm mechanism 14. This reversal permits usual steering movements in driving forwardly (i. e. backwardly under the normal arrangement). This enables the body to be accurately and easily maneuvered to position either to discharge its contents or to spread or scrape materials in front of it. This arrangement further avoids the necessity of turning the truck around to place it in position for dumping, thereby saving a great amount of time which is ordinarily consumed in turning the truck in close quarters.

The dumping body 15 is supported on rails in the form of channels 16 secured adjacent their forward ends to the axle 17 (normally the rear axle) on opposite sides of the chassis 18. The other ends of the channels extend to points opposite the engine and are there appropriately supported by the chassis.

A portion of the bottom of the body 15 is curved as at 19 and fitted with guiding members in the form of curved channels 20 which fit over the upper flanges of channels 16 and provide means by which the body may in effect roll along the channels as it discharges or resumes its normal position. This rolling action advantageously shifts the point of support in the direction of the movement of the center of gravity of the body 15 (and its contents), thereby lessening the shock when the body tilts to discharge or returns to normal position.

The body is designed to extend sufficiently beyond the ends of channels 16 that when in discharge position its end may be used to spread or level the discharged contents by moving the tractor backward or forward. This rearwardly extending portion is of a size and capacity to shift the center of gravity of the loaded body slightly to the rear of its point of support so that when the body is released it will tilt to discharge position. When the contents have been discharged the deep end is of sufficiently greater weight to cause the body when released from discharge position to fall back to normal position.

The body is held in discharge position by a support in the form of a hinged leg comprising two links 21 and 22 hinged respectively at 23 and 24 to the body and chassis respectively, and connected together at 25 by a pin and slot joint providing a lost-motion connection. Preferably the connection at 23 is made in one of a series of holes (Figs. 1 and 3) in a T-bar 25ª secured to the underside of the body. The link 21 is provided with a channel portion 26 which embraces the link 22

(see Fig. 4) permitting it to hinge only in one direction (as shown by dot and dash lines in Fig. 4). When in extended position (Fig. 4) the hinge 25 lies slightly beyond the straight line joining hinge parts 23 and 24, so that the support may assume a thrust without folding together. This position is maintained by spring 27 connecting the links and exerting a slight turning movement on the links for this purpose. Under certain conditions, spring 27 may be effective to cushion relative movement between links 21 and 22, and then acts as a shock absorber to absorb the shock of dumping. Ordinarily, however, the check hereinafter described is used for this purpose.

The hinged leg not only enables the end of the body to be used to level or shift material on the ground but prevents the body from resuming normal position before its contents have been completely discharged.

The discharge position of the body (e. g. its inclination) may be adjusted by shifting the point of connection of the hinged leg with the chassis. In the present instance this is effected by shifting the link pivot bracket 28 along its supporting angle iron 29, the latter being provided with a series of bolt holes 30 for this purpose. The angle 29 is conveniently attached to the chassis by a bracket 31 secured to the chassis by a bolt 32 which passes through the opening originally provided for the seat spring. Thus no drilling of the chassis is necessary. By the described construction, the entire leg may be adjusted longitudinally of the chassis to take care of different sizes and shapes of bodies, or to allow for different work to be accomplished.

The tilting movement of the body is checked by a connecting element in the form of a chain 33 attached to the body and the chassis. A compression spring 34 (Fig. 2) interposed in the connecting element cushions the shock when the chain becomes taut. The length of the chain may be adjusted in accordance with the adjustment of the links 21 and 22 by a bracket 35 (Fig. 2) on channel 16 having a slot to receive any desired link of the chain. The chain adjustment relative to the support is such that it will normally check the tilting movement of the body before any tension is placed on the links of the support. The slot in link 21 at the hinge 25 is provided to allow some longitudinal extension of the links so as to insure that the checking stress will be assumed primarily by chain 33. However, the parts may be adjusted so that spring 27 also cushions the shock of stopping the body as it dumps.

The leg is "broken" (see Fig. 4) to permit the restoration of the body to normal position by control rod 36 (Fig. 3) connected by a chain 36ª to link 22, whereby the links may be moved to the right (Figs. 3 and 4) until the pivot 25 is out of alinement with the pivots 23 and 24, whereupon the weight of the body will cause the links to fold as indicated in Figures 1 and 4.

The body is conveniently held in normal position by latches 37 (Figs. 2 and 3) which engage adjustable stops 38 on the end of the body. The stops are rendered adjustable by bolts 39 by means of which the stops may be raised or lowered so that in locked position the body will be held snugly against the supporting channels 16. The latches are pivoted at 40 and passed over the extremities of the stops 38 by compression springs 41 which bear against arms 42 projecting from the latches.

The latches are released to permit the body to tilt by rock arms 43 (Fig. 3) secured to a cross shaft 44 and carrying laterally projecting pins 45 which engage upwardly extending portions 46 of the latches. The shaft 44 is supported at its ends in brackets 47 mounted on the chassis. A foot pedal 48 positioned to be operated by the right foot of the driver is provided to rock the shaft 44 and release latches 37. Stops 49 on the latches engage the truck frame as at 50 to prevent the springs 41 from moving the latches in too far, particularly after the body has tilted. Springs 41 are carried on spring rods 51 (Fig. 3) which pass through a hole in the truck frame (Fig. 5) and are pivotally connected at their opposite ends to the latch arms 42, the spring bearing against the truck frame. A depending arm shown at 51ª (Fig. 2) secured to the shaft 44 adjacent one of the brackets 47 and positioned to engage the inclined sides of the brackets limits the rocking movement of the shaft and prevents the foot pedal from tilting out of position after the body has been released.

The control rod 36 is advantageously connected to one of the latches 37 through a spring rod 51, which as shown in Figs. 3 and 5, extends through part of the truck frame. A push on pedal 48 thereby shifts rod 36 longitudinally resulting in releasing of the latches and the "breaking" of the leg. The operation of rod 36 may be adjusted to the leg by a series of holes 52 which permit an adjustment of the slack in chain 36ª. Adjustment to the movement of the latch 37 is effected by an elongated nut 53 (Fig. 5) pivoted to rod 36 and into which the spring rod 51 may be screwed varying distances. The nut 54 serves as a stop against the pressure of spring 41.

By the described construction, the body may be released to tilt by pressing upon pedal 48, which releases the latches. After dumping takes place, a corresponding movement of the pedal "breaks" the leg, permitting the body to fall back to normal position. In doing so the stops 38 engage the cam surfaces 55 on the latches, which, actuated by springs 41, move into locking engagement.

In the present instance the motor clutch pedal 56 (Fig. 1) is advantageously supported on shaft 44 in position to be operated by the left foot of the driver. The arm of the pedal is offset at 57 (Fig. 2) and in this case is integrally connected with sleeve 58 which is loosely carried on shaft 44. The clutch pedal is connected to the clutch rod 59 by rock arms 60 and 61, the former being integral with sleeve 58.

Obviously the invention is not limited to the details of the illustrative truck since these may be variously modified. Moreover, it is not indispensable that all features of the invention be used conjointly as various features may be employed in different combinations and sub-combinations.

Having described one embodiment of our invention, we claim:—

1. In a dumping truck the combination comprising a tilting body; a supporting leg for holding the body in tilted position; locking means for holding the body in normal position, including a pivoted latch; control means for said latch; a connection between said latch and supporting leg, whereby said leg may be released by operation of said latch control means; said connection comprising a spring rod directly connected with the latch, a control rod connected to the spring rod, and a chain connecting the control rod and the supporting leg.

2. In a dumping truck the combination comprising a tilting body; a supporting leg for holding the body in tilted position; locking means for holding the body in normal position, including a pivoted latch; control means for said latch; means connecting said leg with said latch, whereby operation of said latch control means will release said supporting leg; said means comprising a longitudinally shiftable rod connected with the latch, and a chain connecting the rod with the supporting leg, and means for adjusting said rod to coordinate its operation with the range of movement of said latch control means.

3. In combination, a tilting dump body; a frame supporting the body; a sectional leg pivoted at its opposite ends to the body and the frame respectively and adapted to hold the body in tilted or full dumping position; a latch pivoted on the frame; a keeper on the body with which the latch engages; a spring urging said latch into body-holding position; an operator-controlled pedal having means engaging the latch, when it is depressed, to move the latch against resistance of its spring to release the body; the latch being movable independently of the pedal to body-holding position; and means connected to the latch and mounting said spring and loosely connected to the sectional leg, so that after the body has been released and has assumed the full dumping position and is held by the sectional leg, the leg may be folded by pressing again on the pedal.

In testimony, that we claim the foregoing as our own, we have hereto affixed our signatures.

ARTHUR S. HUGHES.
HOWARD F. GORSUCH.